(12) United States Patent
Bellmann et al.

(10) Patent No.: US 8,822,586 B2
(45) Date of Patent: *Sep. 2, 2014

(54) CATIONIC POLYMER DISPERSIONS, METHOD FOR PRODUCING SAID DISPERSIONS AND USE THEREOF

(75) Inventors: Susanne Bellmann, Ratingen (DE); Norbert Steiner, Alzenau (DE); Joerg Issberner, Willich (DE); Christian Boekelo, Krefeld (DE)

(73) Assignee: Hercules Incorporated, Wilmington, DE (US)

( * ) Notice: Subject to any disclaimer, the term of this patent is extended or adjusted under 35 U.S.C. 154(b) by 1616 days.

This patent is subject to a terminal disclaimer.

(21) Appl. No.: 11/813,136

(22) PCT Filed: Nov. 30, 2005

(86) PCT No.: PCT/EP2005/012759
§ 371 (c)(1),
(2), (4) Date: Feb. 12, 2008

(87) PCT Pub. No.: WO2006/072294
PCT Pub. Date: Jul. 13, 2006

(65) Prior Publication Data
US 2009/0050571 A1    Feb. 26, 2009

(30) Foreign Application Priority Data
Dec. 30, 2004   (DE) .......... 10 2004 063 791

(51) Int. Cl.
| | | |
|---|---|---|
| C08F 2/16 | (2006.01) |
| C08F 2/20 | (2006.01) |
| C08F 6/00 | (2006.01) |
| C08F 220/56 | (2006.01) |
| D21H 17/37 | (2006.01) |
| D21H 17/45 | (2006.01) |
| D21H 21/10 | (2006.01) |

(52) U.S. Cl.
CPC .......... *D21H 17/455* (2013.01); *C08F 2/20* (2013.01); *C08F 6/006* (2013.01); *C08F 220/56* (2013.01); *D21H 17/375* (2013.01); *D21H 21/10* (2013.01)
USPC ............ 524/460; 524/458; 524/521

(58) Field of Classification Search
USPC .......................... 524/458, 460, 521
See application file for complete search history.

(56) References Cited

U.S. PATENT DOCUMENTS

| | | | |
|---|---|---|---|
| 5,597,859 A | 1/1997 | Hurlock et al. | |
| 5,708,071 A | 1/1998 | Takeda | |
| 6,133,368 A * | 10/2000 | Hurlock et al. | ............... 524/521 |
| 6,221,957 B1 | 4/2001 | Nzudie et al. | |
| 2004/0034145 A1 | 2/2004 | Fischer et al. | |
| 2007/0032677 A1 | 2/2007 | Herth et al. | |
| 2007/0173586 A1 | 7/2007 | Herth et al. | |
| 2008/0033094 A1 | 2/2008 | Bellmann et al. | |

FOREIGN PATENT DOCUMENTS

| | | |
|---|---|---|
| DE | 195 32 229 | 3/1997 |
| DE | 100 61 483 | 6/2002 |
| EP | 0717056 | 12/1994 |
| EP | 0637598 | 2/1995 |
| FR | 2 792 641 | 10/2000 |

OTHER PUBLICATIONS

U.S. Appl. No. 11/722,956, filed Jun. 27, 2007, Bellmann, et al.

* cited by examiner

*Primary Examiner* — David W Wu
*Assistant Examiner* — Marie Reddick

(57) ABSTRACT

The invention relates to water-in-water polymer dispersions containing a polymer A with a cationic monomer fraction of up to 60 wt. % and at least one polymer dispersant B, based on cationised dialkylaminoalkyl (meth)acrylamides with an average molecular weight of between 75,000 and 350,000 g/mol. The invention also relates to a method for producing said dispersions and to the use of the latter.

8 Claims, No Drawings

CATIONIC POLYMER DISPERSIONS, METHOD FOR PRODUCING SAID DISPERSIONS AND USE THEREOF

The present invention relates to cationic water-in-water polymer dispersions containing a finely dispersed, water-soluble or water-swellable polymer A with a cationic monomer content of up to 60 wt. % and a continuous aqueous phase containing a cationic polymeric dispersant B, to a method for the production thereof, and to the use thereof as flocculation aids e.g. in paper making or sedimentation of solids.

In the following text, the abbreviation (meth)acryl(ic) denotes both acryl(ic) and methacryl(ic); for example, (meth)acrylamide means both acrylamide and methacrylamide.

Water-in-water polymer dispersions and the production thereof have been repeatedly described in the prior art. In general, such dispersions are produced by mixing a low-molecular weight polymeric dispersant in aqueous solution with cationic monomer components and subsequent polymerisation thereof. What is attempted in essence is to avoid rheological problems during the production thereof and to obtain water-in-water dispersions which are easier to handle.

WO 98/14405 teaches cationic water-in-water dispersions in which the mere presence of a mixture of a cosmotropic and a chaotropic or an anionic, organic salt during polymerisation makes it possible to decrease the viscosity of the resulting water-in-water dispersions. By way of example, dispersions with cationic monomer contents in the high-molecular weight polymer fraction of between 20 and 83% and polymeric dispersants with molecular weight averages of between 180,000 and 1,500,000 are used. Despite the above-mentioned addition of salts, it is possible that, independently of the content of cationic monomers, an unexpectedly massive, uncontrollable increase in viscosity may occur in the event of minor deviations in the salt content or small variations in the cationic monomer component.

WO 98/31748 describes cationic water-in-water dispersions which contain 2 to 3 wt. % of low-molecular weight polymer amines based on a condensation product of diamine and epichlorohydrin as polymeric dispersant. The dispersions are stable and, despite a relatively high proportion of dispersed polymer, pourable, provided that a water-soluble inorganic salt in amounts of at least 10 wt. % and an organic acid are added during production before polymerising the dispersed monomer solution. Such high amounts of salts are unacceptable for many intended applications of the water-in-water dispersions.

WO 98/31749 differs from WO 98/31748 by the additional use of polyhydroxy compounds, e.g. polyethylene glycol, during polymerisation. In addition, poly-DADMAC and polydicyandiamide are used as polymeric dispersants by way of example. The resulting water-in-water dispersions, optionally including salts as well, are pourable and do not exhibit any irreversible agglomeration when stored. When diluted further, however, they must be diluted beyond a particular level because otherwise, dilution results in an undesirably high increase of the Brookfield viscosity compared to the undiluted water-in-water dispersion. However, this is disadvantageous when using the water-in-water dispersions.

To reduce the viscosity peaks which occur during polymerisation, EP-A-0 630 909 suggests a polymerisation method in which the dispersant polymer of the water-in-water dispersions is initially introduced into an aqueous solution and a proportion of the monomer to be polymerised is apportioned over time. Despite such measures, addition of a polyvalent anionic salt in amounts of at least 15 wt. % is required for viscosity control. Further salt is added in addition to reducing the viscosity of the resulting water-in-water dispersion. In this case as well, the water-in-water dispersions cannot be used without problems in all intended applications due to the high amount of salt.

Cationic flocculants consisting of two different polymer components and methods for the production thereof are known from EP 262 945 A2. Rather than by mixing the polymer components, they are formed by polymerising cationic monomers to yield a high-molecular weight cationic polymer component (flocculant) in the presence of a low-molecular weight cationic polymer component (coagulant). The coagulant has an average molecular weight $M_w$ of less than 1 million g/mol. During the polymerisation reaction, graft reactions may proceed on the initially introduced polymer. Due to their incompatibility with the flocculant based on acrylate monomers, the following coagulant polymers are preferably used: polymers of allyl monomers, particularly poly-DADMAC and amine-epichlorohydrin polymers. The ratio of coagulant to high-molecular weight polyelectrolyte component is specified to be 10:1-1:2, preferably 5:1-1:1.5, i.e. in the preferred embodiment, the proportion of coagulant in the polymer mixture is 83 to 40 wt. %. The high proportions of coagulant during the production of polymerisation solutions give rise to viscosity problems. The properties of the disclosed flocculation agents do not satisfy the demands made on industrial flocculation processes with respect to rapidity and effectiveness.

DE 100 61 483 A1 teaches a method for the production of water-in-water dispersions, in which method a dispersion quality with a long storage life is achieved by adding minor amounts of salt and acids. There is no information as to rheological problems during production in this application document.

During the production of water-in-water dispersions, a massive increase of torque frequently arises at the stirrer as a result of thickening of the polymerisation batch, which can no longer be managed by the stirrers of the polymerisation reactors. Frequently, an increase of torque is observed only after cooling of the polymerisation batch. Such polymerisation batches are no longer usable and must be discarded. The prior art fails to teach any solution to this rheological problem with salt-free or low-salt polymer dispersions.

Moreover, during prolonged storage, especially under extreme conditions such as temperatures above 25° C. and up to 50° C., the water-in-water dispersions known from the prior art may undergo changes, i.e. an impairment of the advantageous properties of the water-in-water dispersions, resulting in extended dewatering times, for example.

The object of the present invention was therefore to provide low-salt or salt-free cationic water-in-water polymer dispersions which exhibit virtually unchanged service properties on storage under extreme conditions, such as temperatures of up to 40° C. Furthermore, if possible, the viscosity of a 5% solution should not fall below 1000 mPa·s, and the product viscosity should not exceed 25,000 mPa·s. Preferably, low values of residual monomers of below 1000 ppm should be achieved. If possible, the polymer dispersions should furthermore have an equivalent or improved profile of properties as flocculation agents as compared to prior art products.

Another object of the invention is to provide a method for the production of said cationic water-in-water polymer dispersions. By virtue of said method, it is intended to ensure that no uncontrollable rheological thickening phenomena occur during polymerisation, that the method products have good flowability with no development of thickening even during storage, have a low content of residual monomers, and satisfy the most recent industrial demands placed on flocculation agents.

Said object is achieved by the provision of cationic water-in-water polymer dispersions containing a cationic polymer A and at least one polymeric cationic dispersant B, characterised in that polymer A is formed from a1) 1 to 60 wt. % of cationic monomers of the type of cationised dialkylaminoalkyl (meth)acrylates and/or dialkylaminoalkyl(meth)acrylamides, and a2) 99 to 40 wt. % of nonionic monomers, and that the polymeric cationic dispersant B is formed from b1) 30 to 100 wt. % of cationised dialkylaminoalkyl(meth)acrylamides and/or cationised N-alkyl- or N,N-dialkyl (meth)acrylamides, and b2) 0 to 70 wt. % of nonionic monomers, and has an average molecular weight $M_w$ of 75,000 to 350,000 g/mol.

The molecular weight of the cationic dispersant B has been found to have a substantial influence on the stability and properties of the cationic water-in-water polymer dispersion according to the invention. The dispersants present in the polymer dispersions according to the invention, with an average molecular weight $M_w$ of from 75,000 to 350,000 g/mol (measured by means of gel permeation chromatography using 1.5% formic acid as eluent versus pullulan standards) yield products having high stability with respect to rheological behaviour during storage, the viscosity of diluted solutions for use, and the storage properties thereof. Preferably, the polymeric dispersants are used with an average molecular weight range of from 90,000 to 280,000 g/mol and more preferably from 95,000 to 235,000 g/mol.

As polymeric dispersant B, cationic polymers are used, which are synthesised from 30 to 100 wt. %, preferably 50 to 100 wt. %, and more preferably 100 wt. % of cationic monomer units derived from cationic, ethylenically unsaturated monomers of the type of dialkylaminoalkyl(meth)acrylamides and/or N-alkyl- or N,N-dialkyl(meth)acrylamides.

Examples of such monomers are dialkylaminoalkyl(meth)acrylamides with 1 to 6 C atoms, preferably with 1 to 3 C atoms in the alkyl or alkylene groups, such as dimethylaminoethyl(meth)acrylamide, diethylaminoethyl(meth)acrylamide, diethylaminopropyl(meth)acrylamide, dimethylaminopropyl(meth)acrylamide, diethylaminopropyl(meth)acrylamide, dimethylaminobutyl(meth)acrylamide, diethylaminobutyl(meth)acrylamide, and cationised N-alkyl- or N,N-dialkyl(meth)acrylamides with alkyl residues of 1 to 6 C atoms, such as N-methyl(meth)acrylamide, N,N-dimethylacrylamide, N-ethyl(meth)acrylamide, N-propyl(meth)acrylamide, tert.-butyl(meth)acrylamide.

The basic monomers are used in a form neutralised with mineral acids or organic acids or in a quaternised form, such quaternisation preferably being effected using dimethyl sulfate, diethyl sulfate, methyl chloride, ethyl chloride or benzyl chloride. In a preferred embodiment, monomers quaternised with methyl chloride or benzyl chloride are used.

Preferred cationic monomer components are cationised amides of (meth)acrylic acid, each one containing a quaternised N atom, and particularly preferably, quaternised dimethylaminopropylacrylamide is used.

Optionally, the polymeric dispersants B may contain up to 60 wt. %, preferably up to 40 wt. %, and more preferably up to 25 wt. % of additional cationic monomers such as dialkylaminoalkyl (meth)acrylates.

In addition to the above-mentioned cationic monomers, other nonionic and amphoteric monomers may be involved in the synthesis of the polymeric dispersant B.

Compounds of general formula (I)

in which $R^1$ denotes hydrogen or a methyl residue, and $R^2$ and $R^3$ mutually independently denote hydrogen, an alkyl or hydroxyalkyl residue with 1 to 5 C atoms, can be used as nonionic monomers during production of the dispersant polymer B. Preferably, (meth)acrylamide, N-methyl(meth)acrylamide, N-isopropyl(meth)acrylamide or N,N-substituted (meth)acrylamides such as N,N-dimethyl(meth)acrylamide, N,N-diethyl(meth)acrylamide, N-methyl-N-ethyl(meth)acrylamide or N-hydroxyethyl(meth)acrylamide are used, with acrylamide being particularly preferred. The nonionic monomer components can be incorporated by polymerisation into the dispersant polymer in amounts of up to 70 wt. %, preferably up to 50 wt. %.

Compounds of general formula (III) or (IV)

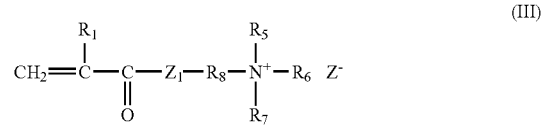

in which $Z_1$ denotes O, NH, $NR_4$, with $R_4$ denoting alkyl with 1 to 4 carbon atoms, $R_1$ denotes hydrogen or a methyl residue, $R_8$ denotes alkylene with 1 to 6 carbon atoms, $R_5$ and $R_6$ mutually independently denote an alkyl residue with 1 to 6 carbon atoms, $R_7$ denotes an alkyl, aryl and/or aralkyl residue with 8 to 32 carbon atoms, and $Z^-$ denotes halogen, pseudonalogen, $SO_4CH_3^-$ or acetate, or

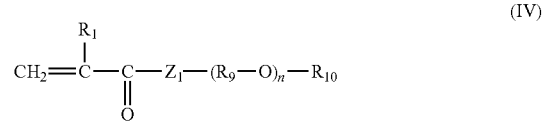

in which $Z_1$ denotes O, NH, $NR_4$, with denoting alkyl with 1 to 4 carbon atoms, $R_1$ denotes hydrogen or a methyl residue, $R_{10}$ denotes hydrogen, an alkyl, aryl and/or aralkyl residue with 8 to 32 carbon atoms, $R_9$ denotes an alkylene residue with 2 to 6 carbon atoms, and n denotes an integer from 1 to 50, can be used as amphiphilic monomer components of the dispersant polymer B.

These preferably comprise reaction products of (meth)acrylic acid and polyethylene glycols (10 to 40 ethylene oxide units), which are etherified with a fatty alcohol, or the corresponding reaction products with (meth)acrylamide.

Amphiphilic monomer components may be involved in the synthesis of the dispersant polymer in amounts of up to 30 wt. %, preferably up to 15 wt. %. In any event, however, care should be taken to select an optionally water-insoluble proportion of amphiphilic, ethylenically unsaturated monomers in such a way that water solubility or water swellability of the polymer A obtained upon polymerisation is not impaired.

The polymeric dispersant B and the polymer A differ from each other, said difference possibly involving physical variables such as different molecular weight and/or chemical structure, as well as different monomer composition.

The cationic polymer A of the cationic water-in-water polymer dispersion according to the invention is composed of cationic monomer units in combination with nonionic and optionally amphiphilic monomers.

Suitable cationic monomers for the production of polymers A are cationised dialkylaminoalkyl (meth)acrylates and diaikyiaminoalkyl(meth)acrylamides with 1 to 6 C atoms in the alkyl or alkylene residue.

Preferably, protonated or quaternised dialkylaminoalkyl (meth)acrylates or dialkylaminoalkyl(meth)acrylamides with 1 to 3 C atoms in the alkyl or alkylene groups are suitable, more preferably the methyl chloride-quaternised ammonium salt of dimethylaminoethyl (meth)acrylate, dimethylaminopropyl (meth)acrylate, dimethylaminoethyl (meth)acrylate, diethylaminoethyl (meth)acrylate, dimethylaminomethyl (meth)acrylate, dimethylaminoethyl(meth) acrylamide and/or dimethylaminopropyl(meth)acrylamide. It is preferred to use dimethylaminoethyl acrylate and dimethylaminopropylacrylamide, with dimethylaminoethyl acrylate being particularly preferred.

The basic monomers are used in a form neutralised with mineral acids or organic acids or in a quaternised form, such quaternisation preferably being effected using dimethyl sulfate, diethyl sulfate, methyl chloride, ethyl chloride or benzyl chloride. In a preferred embodiment, monomers quaternised with methyl chloride or benzyl chloride are used.

The polymer A has a monomer composition which comprises 1 to 60 wt. %, preferably 5 to 55 wt. %. and more preferably 20 to 50 wt. % of cationic monomers, in each case relative to the overall amount of monomers.

The same monomer compounds as described in the composition of the polymeric dispersant B may be considered as nonionic or amphiphilic monomer building blocks of the cationic polymer A. The proportion of nonionic monomers in the polymer A is 99 to 40 wt. %, preferably 95 to 45 wt. %, and more preferably 80 to 50 wt. %. The proportion of amphiphilic monomers in the polymer A is 0 to 30 wt. %, preferably 0 to 15 wt. %.

Preferably, the polymer A consists of a mixture of nonionic monomers, preferably acrylamide, and cationic monomers, preferably dialkylaminoalkyl (meth)acrylates and/or dialkylaminoalkyl(meth)acrylamides which are quaternised. The use of dimethylaminoethyl (meth)acrylate quaternised with methyl chloride is particularly preferred.

The polymers A present in the water-in-water polymer dispersion according to the invention are high-molecular weight, yet water-soluble or water-swellable polymers having an average molecular weight $M_w$ of $>1.5 \times 10^6$ g/mol, as measured according to the GPC method.

The water-in-water polymer dispersions according to the invention contain the high-molecular weight cationic polymer A in amounts of 30 to 70 wt. %, preferably 50 to 65 wt. %, relative to the polymer fraction comprising polymer A and polymeric dispersant B.

The water-in-water polymer dispersions according to the invention contain a proportion of water of 40 to 90 wt. %, preferably 50 to 80 wt. %.

With increasing solids content or increasing proportion of cationic monomer in the polymer A, in has been established that the use of increasing amounts of dispersant polymer B is advantageous in the polymer dispersions according to the invention.

When co-using additional water-soluble dispersant components in combination with the polymeric dispersant B, it is advisable to maintain a weight ratio of polymeric dispersant B to said components of 1:0.01-0.5, preferably 1:0.01-0.3. By way of example, cellulose derivatives, polyvinyl acetates, starch, starch derivatives, dextrans, polyvinylpyrrolidones, polyvinylpyridines, polyethyleneimines, polyamines, polyvinylimidazoles, polyvinylsuccinimides, polyvinyl-2-methylsuccinimides, polyvinyl-1,3-oxazolidin-2-ones, polyvinyl-2-methylimidazolines and/or the respective copolymers thereof with maleic acid, maleic anhydride, fumaric acid, itaconic acid, itaconic anhydride, (meth)acrylic acid, salts of (meth)acrylic acid and/or (meth)acrylamide compounds may be mentioned as additional dispersants.

Optionally, the water-in-water polymer dispersions according to the invention may contain further conventional components, e.g. in the form of water-soluble acids and/or salts. The acid can be present in amounts of 0.1 to 3 wt. % and the salt in amounts of 0.1 to 3 wt. % at most, each relative to the overall dispersion, and acid and salt taken together can be present in amounts of 5 wt. % at most, preferably 4 wt. %, relative to the overall dispersion.

Water-soluble organic acids and/or inorganic acids can also be present. More specifically, suitable organic water-soluble acids are organic carboxylic acids, sulfonic acids, phosphonic acids, preferably aliphatic or aromatic mono-, di-, polycarboxylic acids and/or hydroxycarboxylic acids, preferably acetic acid, propionic acid, citric acid, oxalic acid, succinic acid, malonic acid, adipic acid, fumaric acid, maleic acid, benzoic acid, especially preferably citric acid, adipic acid and/or benzoic acid. Suitable inorganic acids are water-soluble mineral acids, preferably hydrochloric acid, sulfuric acid, nitric acid and/or phosphoric acid. Very particularly preferred are citric acid, adipic acid, benzoic acid, hydrochloric acid, sulfuric acid and/or phosphoric acid.

Ammonium, alkali metal and/or alkaline earth metal salts, preferably ammonium, sodium, potassium, calcium and/or magnesium salts, can be used as water-soluble salts. Such salts can be salts of an inorganic acid or of an organic acid, preferably of an organic carboxylic acid, sulfonic acid, phosphonic acid, or of a mineral acid. The water-soluble salts are preferably salts of an aliphatic or aromatic mono-, di-, polycarboxylic acid, of a hydroxycarboxylic acid, preferably of acetic acid, propionic acid, citric acid, oxalic acid, succinic acid, malonic acid, adipic acid, fumaric acid, maleic acid or benzoic acid, or sulfuric acid, hydrochloric acid or phosphoric acid. Very particularly preferably, sodium chloride, ammonium sulfate and/or sodium sulfate are used as water-soluble salts. The salts can be added before, during or after polymerisation, polymerisation preferably being carried out in the presence of a water-soluble salt.

Furthermore, the water-in-water polymer dispersions according to the invention may contain water-soluble polyfunctional alcohols and/or reaction products thereof with fatty amines in amounts of up to 30 wt. %, preferably up to 15 wt. %, and more preferably up to 10 wt. %, relative to the polymeric dispersant B. More specifically suitable in this context are polyalkylene glycols, preferably polyethylene glycols, polypropylene glycols, block copolymers of propylene/ethylene oxides, with molecular weights of 50 to 50,000, preferably 1,500 to 30,000, low-molecular weight polyfunctional alcohols such as glycerol, ethylene glycol, propylene glycol, pentaerythritol and/or sorbitol as polyfunctional water-soluble alcohols and/or the reaction products thereof with fatty amines having $C_6$-$C_{22}$ in the alkyl or alkylene residues.

The present invention also provides a polymerisation method for the production of the water-in-water polymer dispersions according to the invention.

According to the invention, the production of water-in-water polymer dispersions from a cationic polymer A and at least one polymeric cationic dispersant B is characterised in that, in a polymerisation reactor, an aqueous solution of a polymeric cationic dispersant B with an average molecular weight $M_w$ of from 75,000 to 350,000 g/mol, synthesised from
b1) 30 to 100 wt. % of cationised dialkylaminoalkyl(meth) acrylamides and/or cationised N-alkyl- or N,N-dialkyl (meth)acrylamides, and
b2) 0 to 70 wt. % of nonionic monomers, and a monomer mixture of
a1) 1 to 60 wt. % of cationised mono- and/or dialkylaminoalkyl (meth)acrylates and/or dialkylaminoalkyl (meth)acrylamides, and
a2) 40 to 99 wt. % of nonionic monomers, are combined and, with addition of free-radical initiators, free-radical polymerisation of the monomer mixture is performed.

The method according to the invention allows reliable production of water-in-water polymer dispersions with a cationic fraction of 1 to 60 wt. % in the high-molecular weight polymer fraction, while avoiding rheological problems, and makes it possible to impart extremely stable properties with respect to storage to the polymer dispersions, and to achieve advantageous solution viscosities and service properties.

To carry out the method according to the invention, the continuous aqueous phase containing the polymeric dispersant B and optionally further additives such as salts, acids or polyfunctional alcohols is produced by dispersing the monomers or an aqueous solution thereof in accordance with known dispersing methods, preferably by stirring.

The aqueous phase in which the monomers, preferably in the form of an aqueous solution, are dispersed must contain sufficient water-soluble polymeric dispersant B, so that the polymer A which forms during polymerisation remains dispersed and uncontrolled growth of the polymer particles and/or agglomeration of the polymer particles being formed is prevented. Preferably, the polymeric dispersant B is used in the form of a 20 to 80 wt. % aqueous solution, more preferably 30 to 50 wt. %.

The monomers, in an amount of 5 to 60 wt. %, preferably 10 to 50 wt. %, relative to the overall solution or resulting overall dispersion, are dispersed in the aqueous phase which contains at least one dispersant B. The monomers undergo polymerisation to form the high-molecular weight polymer A.

When co-using additional water-soluble dispersant components together with the polymeric dispersant B, the various dispersants are either dissolved together in the aqueous phase, or, in a preferred embodiment, dissolved separately beforehand and subsequently combined to form a single solution. The weight ratio of polymeric dispersant B to additional components is 1:0.01-0.5, preferably 1:0.01-0.3.

The monomers of the polymer A to be formed can be directly incorporated as such into the continuous aqueous phase containing the polymeric dispersant, or preferably in the form of an aqueous monomer solution. Similarly, complete or partial dispersion of the monomers or monomer solution in the dispersant B can be effected at the beginning of the polymerisation, the remainder of the monomers or monomer solution being added as metered portions or as a continuous feed distributed over the entire course of polymerisation.

For example, free-radical initiators, so-called polymerisation initiators, are used to start the polymerisation. Preferably, azo compounds such as 2,2'-azobisisobutyronitrile, 2,2'-azobis(2-aminopropane) dihydrochloride or preferably potassium persulfate, ammonium persulfate, hydrogen peroxide, optionally in combination with a reducing agent, e.g. an amine or sodium sulfite, are used as free-radical initiators. The amount of initiator, relative to the monomers to be polymerised, generally ranges from $10^{-3}$ to 1 wt. %, preferably from $10^{-2}$ to 0.1 wt. %. The initiators can be added completely or also only in part at the beginning of the polymerisation, with subsequent apportioning of the residual amount over the entire course of polymerisation. In a preferred embodiment, the polymerisation is initiated by means of a redox initiator system and, after reaching the maximum temperature, continued with an azo initiator to reduce the content of residual monomers.

In another advantageous embodiment, once the exothermic polymerisation reaction is complete, i.e. generally after the temperature maximum, the content of residual monomers is further reduced by subsequent addition of redox initiator.

In another advantageous embodiment of the invention, both monomer solution and dispersant solution are apportioned into the polymerisation reactor during polymerisation. In general, a portion, e.g. 10 to 20% of the monomer solution and dispersant solution, is initially introduced. Following initiation of polymerisation, the above-mentioned apportioning is effected, optionally accompanied by further apportioning of polymerisation initiator.

In addition, it is also possible to carry out the production of the water-in-water dispersions in accordance with the methods of EP-A-0 664 302, the relevant disclosure of which is hereby incorporated by reference. Essentially, this procedure involves removal of water during polymerisation and optional addition of polymeric dispersant B.

The polymerisation temperature generally is 0 to 120° C., preferably 30 to 90° C. The polymerisation is preferably carried out in such a way that the system is purged with an inert gas and polymerised under an inert gas atmosphere, e.g. under a nitrogen atmosphere. Polymerisation conversion or the end of polymerisation can easily be detected by determining the content of residual monomers. Methods for this purpose are familiar to those skilled in the art.

Following polymerisation, it can be advantageous to cool down the reaction mixture before optionally adding further additives such as salts or acids to the dispersion, preferably with stirring.

If addition of acid is envisaged, the latter is added in amounts of 0.1 to 3.0 wt. %, relative to the overall dispersion. Such addition can be effected before, during or after the polymerisation. Addition after polymerisation is preferred. In an advantageous embodiment, once the acid component has been added, the polymers have a pH of 3 to 4 when diluted to form a 5% solution.

If a salt is used during production of the water-in-water polymer dispersion, the salt is preferably added in amounts of 0.1 to 3.0 wt. %, relative to the overall dispersion. The salt can be added before, during or after the polymerisation, with addition before polymerisation being preferred. The amounts of added water-soluble acid and optionally added water-soluble salt should preferably be 5 wt. % at most, preferably 4 wt. %, relative to the overall dispersion.

If the polymeric dispersant B is used together with a water-soluble polyfunctional alcohol and/or the reaction product thereof with fatty amines, addition thereof to the aqueous solution of the polymeric dispersant B is effected before polymerisation.

The polymers A produced according to the method according to the invention are high-molecular weight, yet water-soluble or water-swellable polymers. The average molecular weight $M_w$ of the polymer mixture present in the polymer dispersion, comprising polymer A and polymeric dispersant B, is in a range above $1.5 \times 10^6$ g/mol, as measured according to the GPC method.

The water-in-water polymer dispersions obtainable according to the invention have the unexpected advantage of being excellent flocculants in the sedimentation of solids, preferably in water and process water treatment or in waste water purification, or in the recovery of raw materials, preferably coal, aluminium or petroleum, auxiliaries in paper making, or demulsifiers in the separation of aqueous mixtures containing oil and/or fat, excellent thickeners, retention and dewatering agents in paper making and/or additives for phytosanitary agents, optionally together with other biologically active substances, or antierosion agents, and in fact, not only subsequent to the production thereof, i.e. without significant storage, optionally after dilution with water. The water-in-water dispersions obtainable according to the invention exhibit said outstanding effectiveness virtually unchanged even after prolonged storage under extreme conditions, such as elevated temperatures, i.e. temperatures above 25° C. and up to a maximum of 50° C. Such preservation of quality of the dispersions obtainable according to the invention is a requirement of the user industry which has hitherto been unmet and is indispensable, inter alia, in those cases where such dispersions are transported to and used in regions with extreme climatic conditions.

Determination Methods

Solution Viscosity:

To determine the solution viscosity of the water-in-water polymer dispersions produced according to the invention, a 5% solution is prepared. The measurement requires 340 g of said 5% solution. To this end, the required amount of deionised water is placed in a 400 ml beaker. Subsequently, the initially introduced water is stirred with a finger agitator at an intensity such that a cone is formed that reaches down to the bottom of the beaker. The amount of water-in-water dispersion required to produce the 5% solution is injected into the initially introduced, stirred water as a single portion, using a disposable syringe. Thereafter, the solution is stirred at 300 rpm (±10 rpm) for one hour. After standing for 10 minutes, the Brookfield viscosity is determined using an RVT-DV II Brookfield viscosimeter with a no. 2 spindle at a speed of 10.

Salt Viscosity:

An amount of 289 g of deionised water is weighed out into a 400 ml beaker. Subsequently, the initially introduced water is stirred with a finger agitator at an intensity such that a cone is formed that reaches down to the bottom of the beaker. An amount of 17 g of the water-in-water dispersion produced according to the invention is injected into the initially introduced, stirred water as a single portion, using a disposable syringe. Once the water-in-water dispersion has dissolved, 34 g of sodium chloride (technical grade) are sprinkled in. After stirring for 16 minutes at 300 rpm (±10 rpm), the solution is left to stand for a further 10 minutes. Thereafter, the Brookfield viscosity is determined using an RVT-DV II Brookfield viscosimeter with a no. 1 spindle at a speed of 10.

EXAMPLES

All the polymeric dispersants used in the Examples are used in the form of a 40 wt. % solution.

Examples E1 To E4 and Comparative Example C1

All Containing 25 wt. % of Cationic Monomer in Polymer A 360 g of dispersant (poly(trimethylammoniumpropylacrylamide chloride)) are added to a solution of 300 g of acrylamide (50%), 244 g of water, 2 g of Versenex 80 (5%), 62.5 g of trimethylammoniumethylacrylate chloride (80%), 9.5 g of ammonium sulfate. The pH is adjusted to 4. The mixture is placed in a 2 liter flask equipped with a KPG stirrer and heated to an initial temperature of 42° C. After removing oxygen by purging with nitrogen, 200 ppm of VA 044 are added. Once the temperature maximum is reached, further initiator (1500 ppm of sodium disulfite, 1500 ppm of sodium peroxydisulfate) is added, and this is allowed to react for another 15 minutes at this temperature. 5 g of citric acid are then is added. The final product is cooled and packaged.

Table 1 below shows test results for dispersants with varying average molecular weight ($M_w$).

TABLE 1

| Ex. | $M_w$ dispersant [g/mol] | Max. torque during polym. [Ncm] | Torque after cooling [Ncm] | Visc. product [mPa·s] | Visc. 5% soln. [mPa·s] | Visc. salt soln. [mPa·s] |
|---|---|---|---|---|---|---|
| C1 | 95,000 | 65 | solidif. | | | |
| E1 | 115,000 | 27 | 18 | 3,680 | 1,420 | 580 |
| E2 | 135,000 | 29 | 22 | 5,280 | 1,620 | 680 |
| E3 | 150,000 | 28.7 | 32 | 6,200 | 1,720 | 738 |
| E4 | 180,000 | 36 | 38 | 9,400 | 1,780 | 730 |

The content of residual monomers in E2 is less than 10 ppm acrylamide.

Examples E5 To E11

All Containing 35 Wt. % of Cationic Monomer in Polymer A 360 g of dispersant (poly(trimethylammoniumpropylacrylamide chloride)) are added to a solution of 245 g of acrylamide (50%), 295 g of water, 2 g of Versenex 80 (5%), 84 g of trimethylammoniumethylacrylate chloride (80%). The mixture is placed in a 2 liter flask equipped with a KPG stirrer and heated to an initial temperature of 35° C. After removing oxygen by purging with nitrogen, 50 ppm of sodium disulfite, 40 ppm of sodium peroxydisulfate, and 5 ppm of tert.-butyl hydroperoxide are added. Once the temperature maximum is reached, further initiator (400 ppm of ABAH) is added, and this is allowed to react for another 15 minutes at this temperature. 5 g of citric acid are then added. The final product is cooled and packaged.

Table 2 below shows test results for dispersants with varying average molecular weight ($M_w$).

TABLE 2

| Ex. | $M_w$ dispersant [g/mol] | Max. torque during polym. [Ncm] | Torque after cooling [Ncm] | Visc. product [mPa·s] | Visc. 5% soln. [mPa·s] | Visc. salt soln. [mPa·s] |
|---|---|---|---|---|---|---|
| E5  | 95,000  | 38.9 | 12   | 3,520  | 1,080 | 210 |
| E6  | 105,000 | 14   | 12   | 4,720  | 1,190 | 269 |
| E7  | 135,000 | 10   | 15.7 | 7,880  | 1,370 | 278 |
| E8  | 150,000 | 9.7  | 15.4 | 7,880  | 1,200 | 240 |
| E9  | 180,000 | 10.6 | 18   | 12,500 | 1,360 | 273 |
| E10 | 200,000 | 11.8 | 20   | 11,800 | 1,220 | 241 |
| E11 | 235,000 | 16.6 | 26.6 | 19,600 | 1,380 | 283 |

Examples E12 To E16

All Containing 50 Wt. % of Cationic Monomer in Polymer A 360 g of dispersant (poly(trimethylammoniumpropylacrylamide chloride)) are added to a solution of 190 g of acrylamide (50%), 316 g of water, 2 g of Versenex 80 (5%), 119 g of trimethylammoniumethylacrylate chloride (80%). The mixture is placed in a 2 liter flask equipped with a KPG stirrer and heated to an initial temperature of 35° C. After removing oxygen by purging with nitrogen, 50 ppm of sodium disulfite, 50 ppm of sodium peroxydisulfate, and 5 ppm of tert.-butyl hydroperoxide are added. Once the temperature maximum is reached, further initiator (400 ppm of ABAH) is added, and this is allowed to react for another 15 minutes at this temperature. 5 g of citric acid are then added. The final product is cooled and packaged.

Table 3 below shows test results for dispersants with varying average molecular weight ($M_w$).

TABLE 3

| Ex. | $M_w$ dispersant [g/mol] | Max. torque during polym. [Ncm] | Torque after cooling [Ncm] | Visc. product [mPa·s] | Visc. 5% soln. [mPa·s] | Visc. salt soln. [mPa·s] |
|---|---|---|---|---|---|---|
| E12 | 150,000 | 31.2 | 16.2 | 7,480  | 1,840 | 235 |
| E13 | 180,000 | 12   | 16.6 | 9,600  | 2,100 | 294 |
| E14 | 200,000 | 7.6  | 14.6 | 10,200 | 2,100 | 278 |
| E15 | 235,000 | 8    | 17.8 | 11,600 | 2,140 | 300 |
| E16 | 280,000 | 9.4  | 21   | 14,000 | 1,930 | 254 |

The content of residual monomers in E14 is 620 ppm acrylamide.

Example E17

60 wt. % Level of Cationic Monomer in Polymer A 450 g of dispersant (poly(trimethylammoniumpropylacrylamide chloride)) are added to a solution of 144 g of acrylamide (50%), 245 g of water, 2 g of Versenex 80 (5%), 135 g of trimethylammoniumethylacrylate chloride (80%). The mixture is placed in a 2 liter flask equipped with a KPG stirrer and heated to an initial temperature of 35° C. After removing oxygen by purging with nitrogen, 50 ppm of sodium disulfite, 50 ppm of sodium peroxydisulfate, and 5 ppm of tert.-butyl hydroperoxide are added. Once the temperature maximum is reached, further initiator (400 ppm of ABAH) is added, and this is allowed to react for another 15 minutes at this temperature. 5 g of citric acid are then added. The final product is cooled and packaged.

Table 4 below shows the test result.

TABLE 4

| Ex. | $M_w$ dispersant [g/mol] | Max. torque during polym. [Ncm] | Torque after cooling [Ncm] | Visc. product [mPa·s] | Visc. 5% soln. [mPa·s] | Visc. salt soln. [mPa·s] |
|---|---|---|---|---|---|---|
| E17 | 235,000 | 10.9 | 20.9 | 9,360 | 1,130 | 175 |

Comparative Example C2

70 wt. % of Cationic Monomer in Polymer A 450 g of dispersant (poly(trimethylammoniumpropylacrylamide chloride)) are added to a solution of 108 g acrylamide (50%), 234 g of water, 9.8 g of ammonium sulfate, 2 g of Versenex 80 (5%), 158 g of trimethylammoniumethylacrylate chloride (80%). The mixture is placed in a 2 liter flask equipped with a KPG stirrer and heated to an initial temperature of 35° C. After removing oxygen by purging with nitrogen, 50 ppm of sodium disulfite, 50 ppm of sodium peroxydisulfate, and 5 ppm of tert.-butyl hydroperoxide are added. Once the temperature maximum is reached, further initiator (400 ppm of ABAH) is added, and this is allowed to react for another 15 minutes at this temperature. 5 g of citric acid are then added. The final product is cooled and packaged.

Table 5 below shows the test result. Clearly, the dispersants to be used according to the invention are unsuitable for highly cationic polymer dispersions.

TABLE 5

| Ex. | $M_w$ dispersant [g/mol] | Max. torque during polym. [Ncm] | Torque after cooling [Ncm] | Visc. product [mPa·s] | Visc. 5% soln. [mPa·s] | Visc. salt soln. [mPa·s] |
|---|---|---|---|---|---|---|
| C2 | 235,000 | 53 | 29.5 | solidif. | | |

Example E18 and Comparative Examples C3 and C4

All Containing 50 Wt. % of Cationic Monomer in Polymer A and Dispersant B with $M_w$ 180,000

360 g of dispersant (poly(trimethylammoniumpropylacrylamide chloride)) are added to a solution of 190 g of acrylamide (50%), 316 g of water, 2 g of Versenex 80 (5%), 119 g of trimethylammoniumethylacrylate chloride (80%). The mixture is placed in a 2 liter flask equipped with a KPG stirrer and heated to an initial temperature of 35° C. After removing oxygen by purging with nitrogen, 50 ppm of sodium disulfite, 50 ppm of sodium peroxydisulfate, and 5 ppm of tert.-butyl hydroperoxide are added. Once the temperature maximum is reached, further initiator (400 ppm of ABAH) is added, and this is allowed to react for another 15 minutes at this temperature. 5 g of citric acid are then added. The final product is cooled and packaged.

Table 6 below shows the test results.

TABLE 6

| Ex. | Dispersant B | Max. torque during polym. [Ncm] | Torque after cooling [Ncm] | Visc. product [mPa·s] | Visc. 5% soln. [mPa·s] | Visc. salt soln. [mPa·s] |
|---|---|---|---|---|---|---|
| E18 | Polydimapa quat.[1] | 4.8 | 8.5 | 9600 | 1820 | 250 |
| C3 | Polyadame quat.[2] | >50 | solidif. | | | |
| C4 | Polydadmac[3] | >50 | solidif. | | | |

[1]Cationic polymer based on dimethylaminopropylacrylamide quaternised with methyl chloride
[2]Cationic polymer based on dimethylaminoethyl acrylate quaternised with methyl chloride
[3]Cationic polymer based on diallyldimethylammonium chloride

EXAMPLES OF INDUSTRIAL APPLICATION

Determination of paper pulp suspension dewatering rate

Using a DFS 03 apparatus from BTG Mütek, the rate of dewatering as a function of time is determined by adding the polymer dispersions according to the invention to specific paper pulp suspensions.

To this end, the polymer dispersions according to the invention are adjusted to a concentration of 0.1% using deionised water. 300 g of a 1% standard waste-paper pulp suspension (15% ashes, 57°SR*) are diluted with tap water to 1000 ml in a Schopper-Riegler freeness tester. The dewatering tests are performed at 3 different concentrations of the polymer dispersion according to the invention (400/800/1200 g/l). In total, the pulp-water mixture is maintained at 600 min⁻ for 25 s, and the diluted dispersion according to the invention is apportioned after the first 10 s. Dewatering proceeds within 60 s, but with 500 g at most. The dewatering times for 500 g of various polymer dispersions and concentrations can be found in the following table.

* The particular pulp condition during refining is expressed as freeness in °SR (Schopper-Riegler degrees)

TABLE 7

| Polymer Example | Concentration [g/l] | Dewatering time [s] |
|---|---|---|
| E1 | 400/800/1200 | 23/19/14.5 |
| E4 | 400/800/1200 | 21/17/12.5 |
| E13 | 400/800/1200 | 20/15.5/12.5 |
| E15 | 400/800/1200 | 21/15.5/13 |

Determination of Retention and Ash Retention

Using a DFS 03 apparatus from BTG Mütek, retention is determined by adding the polymer dispersions according to the invention to specific paper pulp suspensions.

To this end, the polymer dispersions according to the invention are adjusted to a concentration of 0.1 wt. % using deionised water. 500 g of a 1% standard waste-paper pulp suspension are diluted with tap water to 1000 ml in a Schopper-Riegler freeness tester. The retention tests are performed at 3 different concentrations of the polymer dispersion according to the invention (400/800/1200 g/l). In total, the pulp-water mixture is maintained at 600 min⁻¹ for 25 s, diluted polymer dispersion is apportioned after the first 10 s, and the retention filtrate is removed after another 15 s, passed through a Schwarzband grade filter and dried to constant weight at 105° C. for 1 hour. In order to determine ash retention, ashing is performed at 550° C. for 2 h and the ash reweighed in absolutely dry condition.

$$\text{Retention \%} = \frac{PD\ \text{inflow} - PD\ \text{outflow}}{PD\ \text{inflow}} \times 100$$

$$\text{Ash retention \%} = \left(1 - \frac{PD\ \text{outflow} \times \text{ash outflow \%}}{PD\ \text{inflow} \times \text{ash inflow \%}}\right) \times 100$$

PD inflow: pulp density of inflow (pulp suspension) in wt. %
PD outflow: pulp density of filtrate (backwater) in wt. %
Ash outflow: percent mineral combustion residue in wt. % of filtrate (backwater)
Ash inflow: percent mineral combustion residue in wt. % of inflow (pulp suspension)

TABLE 8

400 g/l

| Polymer Ex. | Retention % | Ash retention % |
|---|---|---|
| E1 | 88.21 | 75.80 |
| E4 | 89.15 | 78.13 |
| E13 | 87.48 | 77.09 |
| E15 | 89.20 | 80.27 |

TABLE 9

800 g/l

| Polymer Ex. | Retention % | Ash retention % |
|---|---|---|
| E1 | 90.41 | 83.20 |
| E4 | 89.17 | 79.98 |
| E13 | 90.54 | 83.88 |
| E15 | 91.11 | 83.22 |

TABLE 10

1200 g/l

| Polymer Ex. | Retention % | Ash retention % |
|---|---|---|
| E1 | 91.72 | 85.71 |
| E4 | 92.89 | 86.11 |
| E13 | 93.15 | 87.31 |
| E15 | 92.83 | 85.67 |

Determination of the Dewatering Time of a Paper Pulp Suspension and Simultaneous Assessment of Formation (Permeability) and Turbidity Using a Dynamic Drainage Analyser (DDA) from Akribl Kemiconsulter, the dewatering time with vacuum is determined on addition of the polymer dispersions according to the invention to specific paper pulp suspensions. Turbidity and permeability are measured, which allows conclusions to be drawn as to the formation of the drained paper pulp suspension.

To this end, 500 ml of a 1% paper pulp suspension are placed in a stirred vessel, the inventive products according to Examples 1 and 2 and of the following table are added, stirred for 10 seconds at 600 rpm and subsequently drained over a screen under a vacuum of 500 mbar. The apparatus indicates the dewatering time in seconds and the permeability in millibars. The filtrate is collected and turbidity determined separately.

In the dual system, 6 kg/t of Polymin SK are added and sheared for 15 seconds at 1200 rpm. This is followed by addition of 0.6 kg/t Organopol which is stirred for 10 seconds at 600 rpm. The further test procedure is as described above.

The polymers used are adjusted to a concentration of 0.1 wt. % using deionised water.

TABLE 11

| Product | Rate of addition (kg/t) | Dewatering (s) | Permeability (mbar) | Turbidity (NTU) |
|---|---|---|---|---|
| Polymin ® SK | 6 | 6.3 | 177.6 | 180 |
| Organopol ® 5670 | 0.6 | | | |
| E13 | 3 | 8.5 | 168 | 170 |

Polymin SK is a modified cationic polyethyleneimine from BASF.
Organopol 5670 is a polyacrylamide from CIBA.

The results demonstrate the advantages of the polymer dispersions according to the invention. Comparable results are achieved at low concentrations, two-step polymer addition is no longer required.

The invention claimed is:

1. A method of producing a cationic water-in-water polymer dispersion comprising the step of free-radically polymerizing one or more monomers in an aqueous dispersion of a polymeric cationic dispersant B to form a cationic polymer A wherein the monomers comprise
    (a) from 1 to 60 wt. % based on the weight of the cationic polymer A of cationized N-alkyl- or N,N-dialkylaminoalkyl (meth)acrylates and/or cationized N-alkyl- or N,N-dialkylaminoalkyl(meth)acrylamides, and
    (b) from 40 to 99 wt. % by based on the weight of the cationic polymer A of nonionic monomers,
    and
    the cationic polymeric dispersant B has an average molecular weight $M_w$ of from 75,000 to 350,000 g/mol and is prepared from
    (c) from 30 to 100 wt. % based on the weight of the cationic polymeric dispersant B of cationized N-alkyl- or N,N-dialkylaminoalkyl(meth)acrylamides and/or cationized N-alkyl- or N,N-dialkyl(meth)acrylamides, and
    (d) from 0 to 70 wt. % by based on the weight of the cationic polymeric dispersant B of nonionic monomers, and
    wherein the free radical polymerization occurs in the presence of redox free radical initiators consisting of sodium peroxydisulfate, sodium disulfite and tert.-butylhydroperoxide.

2. The method according to claim 1, characterized in that the polymeric dispersant B is used in the form of an aqueous solution comprising 20 to 80 wt. % polymeric dispersant B based on the weight of the aqueous solution.

3. The method according to claim 2, characterized in that the monomers to be polymerized by free radical polymerization to form the cationic polymer A are present in an amount of 5 to 60 wt. % based on the total weight of the monomers and the aqueous solution.

4. The method according to claim 3, characterized in that only a proportion of the monomers to be polymerized is initially introduced, the reminder being added as metered portions or as a continuous feed during the course of the free-radical polymerization.

5. The method according to claim 3, characterized in that only a proportion of the monomers to be polymerized and of the aqueous solution are initially introduced, the remainder being added as metered portions or as a continuous feed during the course of the free-radical polymerization.

6. The method according to claim 3, characterized in that the free-radical polymerization is performed at temperatures of between 30° and 90° C.

7. The method according to claim 6, characterized in that the initiators for free-radical polymerization are added continuously during the entire course of the polymerization.

8. The method according to claim 7, characterized in that acid is added before, during or after the free-radical polymerization.

* * * * *